March 22, 1927.  G. J. DUNBAUGH, JR  1,621,584

LIQUID LEVEL GAUGE

Filed Sept. 14, 1923   2 Sheets-Sheet 1

Witnesses
W. F. Kilroy
Harry C. White

Inventor
George J. Dunbaugh Jr.
By Hill & Hill Attys.

March 22, 1927.  G. J. DUNBAUGH, JR  1,621,584
LIQUID LEVEL GAUGE
Filed Sept. 14, 1923   2 Sheets-Sheet 2
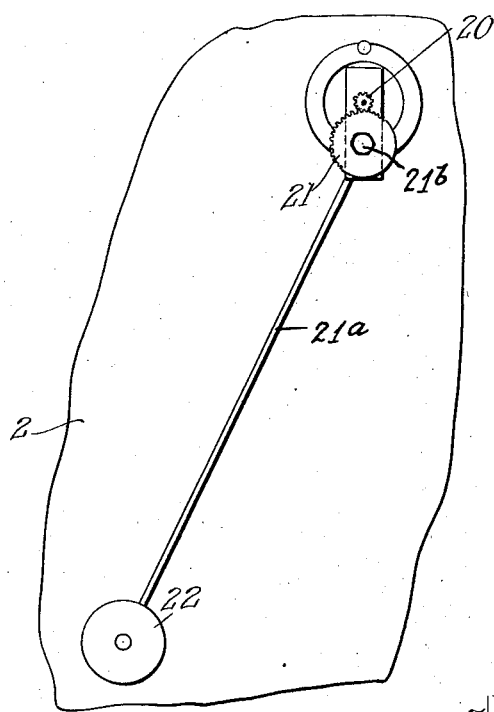
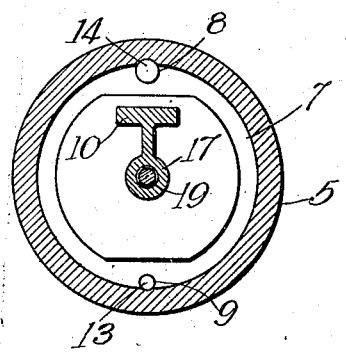
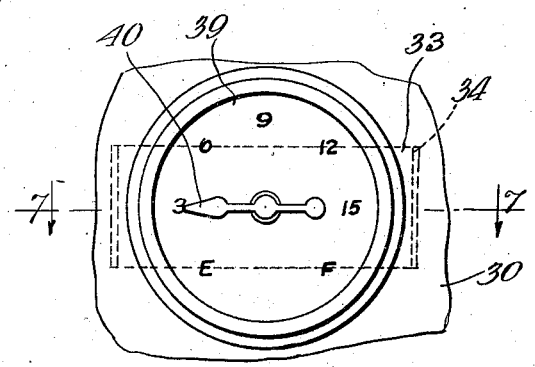
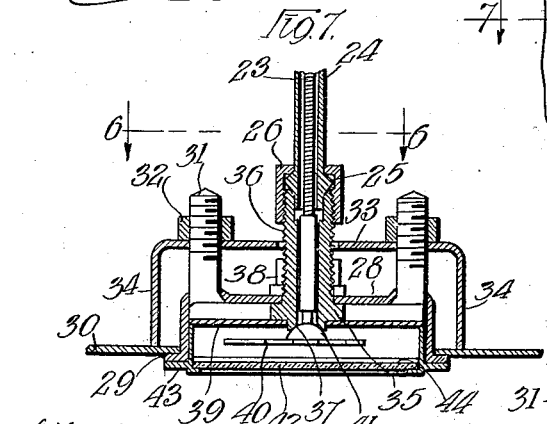
Inventor
George J. Dunbaugh Jr Patented Mar. 22, 1927.

1,621,584

UNITED STATES PATENT OFFICE.

GEORGE J. DUNBAUGH, JR., OF CHICAGO, ILLINOIS, ASSIGNOR TO CHAMPION MANUFACTURING COMPANY, OF CHICAGO, ILLINOIS, A CORPORATION OF ILLINOIS.

LIQUID-LEVEL GAUGE.

Application filed September 14, 1923. Serial No. 662,651.

My invention relates to improvements in gauges, and more particularly to means for indicating the level of liquid in containers at remote points, and especially for indicating at the dashboard of a motor vehicle the level of the gasoline in the tank at the rear of the car.

The invention has among its objects the production of a device of the kind described which is simple, convenient, compact, durable, reliable, efficient, and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 3 is a side elevation of the parts shown in Fig 2;

Fig. 4 is a section taken substantially on the line 4—4 of Fig. 2;

Fig. 5 is a plan view of the indicator portion of my device taken from the front thereof.

Fig. 6 is a plan view of the indicator portion taken from the rear thereof; and

Fig. 7 is a sectional view of the same taken substantially on the line 7—7 of Fig 5.

Figure 1:
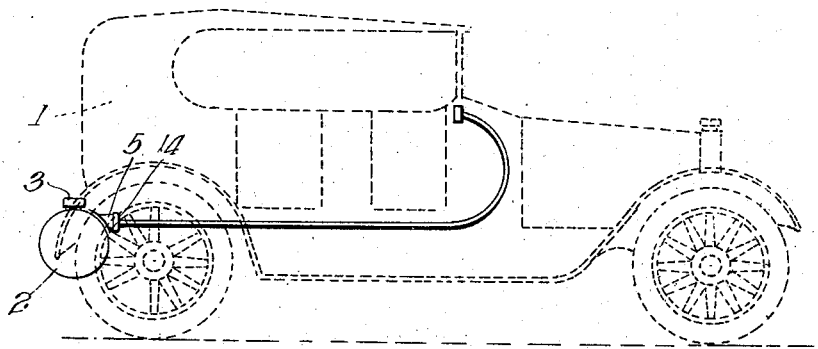
Fig. 1 shows my device as applied to a motor vehicle.

In the drawings, wherein I have illustrated the preferred embodiment of my invention, there is shown a motor vehicle 1, having a container or tank 2 arranged at any suitable point thereof, as for instance, at the rear, as shown, said tank having the usual filling opening 3 and also an outlet opening 4.

A fitting 5, preferably tubular or hollow, is arranged at the outlet opening 4 of the tank 2, the outer end of said fitting being preferably screw-threaded externally as at 6 and provided with an inturned annular flange 7 thereat. Recesses 8 and 9 are formed through the flange 7, these recesses being preferably diametrically opposed as shown, the recess 8 being larger than the recess 9, for a purpose to be more clearly hereinafter described.

Figure 2:
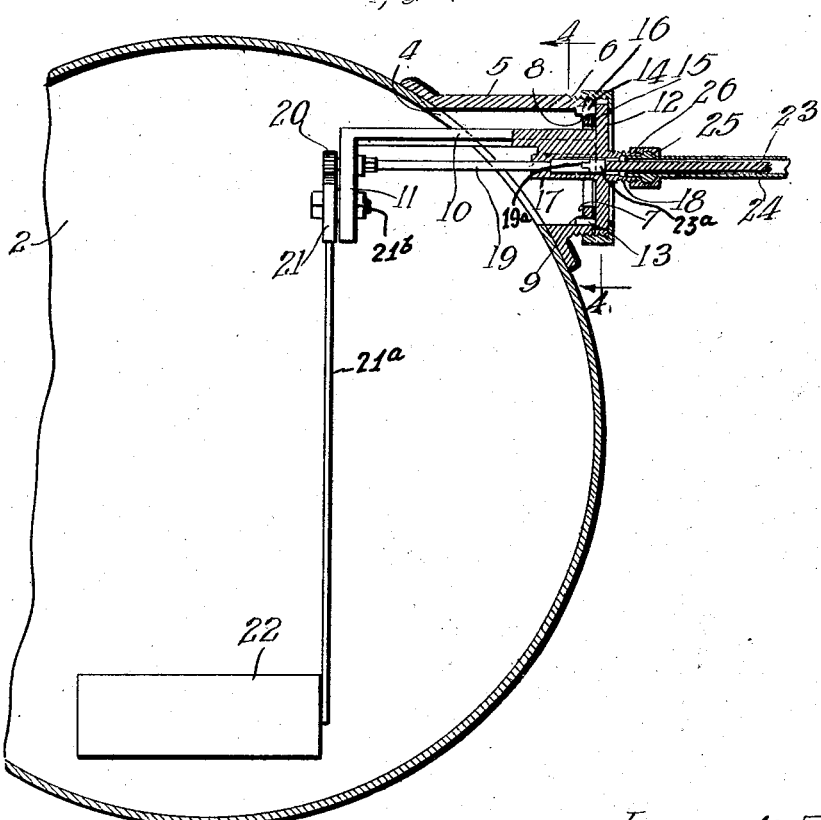
Fig. 2 is a sectional view of the gasoline tank with my device applied thereto.

A bracket comprising a pair of mutually transverse legs 10 and 11 is adapted to be inserted through the fitting 5 from the outer end thereof and to project within the tank 2, as shown more clearly in Fig. 2. A disk or plate 12 is formed integral with the bracket at the outer end of the leg 10, and is adapted to form a closure for the open end of the fitting 5. The disk has dowel pins 13 and 14 thereon adapted to extend within the recesses 9 and 8 respectively of the flange 7 and form guides therewith so as to correctly position the bracket within the tank in the desired assembled position. It is understood that the dowel pin 14 is of a larger size than the pin 13 so as to fit within the recess 8. This construction insures that the apparatus will be properly assembled to position the bracket in the tank 2.

A flanged ring 16 is internally threaded so as to engage the threads 6 of the fitting and to press the plate or disk 12 tightly against the flange 7, but permit the removal of the bracket when the ring is detached. Packing material 15 may be interposed between the disk and the flange so as to minimize or prevent leakage therepast.

Integral with the bracket and disk is a bearing, a portion of which extends on one side of the disk as at 17, and another portion of which extends on the opposite side of the disk as at 18, and is externally threaded thereat. A solid shaft 19 is arranged within the bearing 17, this shaft extending through a bearing aperture in the leg 11 and carrying a gear 20 at its end, said gear meshing with a gear 21 arranged parallel thereto on the leg 11 and carrying a float arm 21ª and a float 22, the gear 21 being rotatably journaled upon a pin 21ᵇ carried by the leg 11.

A flexible shaft 23 is detachably connected at one end to the end of the solid shaft 19, the other end of the flexible shaft extending to suitable indicating means arranged at the dashboard of the vehicle. Any suitable means may be provided for detachably connecting one end of the flexible shaft 23 to the solid shaft 19, but I prefer to provide an extension member 23a upon the flexible shaft, which extension member is adapted to engage a slot 19a formed in the solid shaft. A conduit or sheathing 24 preferably surrounds the flexible shaft, said conduit having tapered enlargements 25 inwardly of the ends thereof. The end of the sheathing adjacent the bearing portion 18 is insertable thereinto, and there is a nut 26 slidable on said sheathing and having a tapered portion engageable with the tapered enlargement 25 and a threaded portion engageable with the threads provided on the part 18, so that when the nut is tightened the end of the conduit will be held tightly in place.

It is obvious that any movement of the float 22, due to the rise or fall of the liquid within the tank, will cause a rotation of the gears and shafts connected thereto. In order to transmit this rotative movement to the indicating means, whereby the amount of the gasoline within the tank may be ascertained, I have arranged an indicator at the dashboard or instrument board of the vehicle. This indicator preferably comprises a casing member 28 having an outwardly directed annular flange 29 which bears against one side of the instrument board 30, as shown more particularly in Fig. 7.

Studs 31 are carried by the bottom of the casing so as to project therefrom and be engaged by nuts 32. A bracket 33 having legs 34 extending laterally therefrom is slidable on the studs 31, and is clamped against the rear of the instrument board by means of the nuts 32 as shown, thus securing the casing firmly but removably in place.

A plug or bushing 35 is arranged to project from both sides of the bottom of the casing 28, the exteriorly projecting portion of the plug being externally screw-threaded as at 36, and the end of the internally projecting portion of the plug or bushing having a spherical recess 37 formed thereat. A nut 38 cooperates with the portion 36 to tightly clamp the plug in place against the casing. A dial 39 is arranged transversely of the casing, and a pointer 40 is movable across the face of the dial, this pointer having a spherical enlargement 41 to seat within the spherical bearing 37 provided at the end of the bushing 35.

A coupling nut 26 cooperates with the threaded part of the bushing 36 and with the conduit 24 to tightly clamp the conduit in place operating in the same manner as the nut 26 previously described. The flexible shaft 23 is connected to the pointer 40, so that any movement of the float is transmitted directly through the flexible shafting to the pointer so as to effect a movement thereof.

A glass plate 42 is arranged at the outer side of the casing, and is held within a sleeve or bezel 43 frictionally fitting within the casing 28. The glass 42 may be held against inward movement by means of a spring ring 44.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, a tank having an opening therein, a hollow fitting adapted to surround said opening, an annular flange formed upon the fitting and provided with apertures of different sizes, a bracket, a plate formed integral with said bracket adapted to engage the end of said fitting, an elongated bearing formed centrally of said plate, different sized dowel pins on said plate to fit said different sized apertures in said flange so as to correctly position said bracket in assembling, a pin projecting from said bracket, a gear mounted on said pin, a shaft inserted through said bearing, a second gear mounted on said shaft and meshed with said first gear, a float, an arm for connecting the float to the first gear, a clamping ring cooperating with the fitting for clamping the plate thereagainst, an indicator, a flexible shaft having one end inserted through said bearing and connected with one end of said first-mentioned shaft, the other end of said flexible shaft being connected to said indicator, a sheathing for the flexible shaft having one end inserted into said bearing, and a nut for clamping said sheathing to said bearing.

2. In a device of the kind described and in combination, a hollow fitting adapted to surround an opening in a tank and having an externally threaded end, an inturned annular flange formed upon the fitting adjacent its threaded end, said flange having different sized apertures formed therein, a bracket formed of a pair of bent arms, a plate integral with said bracket at the end of one of said arms, an elongated bearing centrally of said plate and extending on both sides thereof and integral therewith, different sized dowel pins on said plate to fit within said different sized apertures in said flange so as to correctly position said bracket in assembling, a pair of intermeshing gears disposed adjacent the other of said arms, one of said gears being in line with said bearing, a shaft connected to said gear and inserted through said bearing, a float, means connecting the float to the other of said gears, a clamping ring cooperating with the externally threaded end of the fitting for clamping the plate thereagainst, the outer extending portion of said bearing being externally screw threaded, an indicator, a flexible shaft having one end insertable through said bearing and detachably connected with the end of said first mentioned shaft, the other end of said flexible shaft connected to said indicator, a sheathing having a tapered enlargement adjacent its ends and insertable into the threaded portion of the bearing, and a nut for clamping said tapered portion of the sheathing against the threaded end of the bearing.

In testimony whereof, I have hereunto signed my name.

GEORGE J. DUNBAUGH, Jr.